(12) United States Patent
Bloom et al.

(10) Patent No.: US 9,074,709 B2
(45) Date of Patent: Jul. 7, 2015

(54) PROCESS FOR MANUFACTURING SEALED ROUND METAL DUCTWORK

(75) Inventors: Vincent L. Bloom, Beallsville, PA (US); Douglas G. Gudenburr, Finleyville, PA (US); Christopher A. Armstrong, Brownsville, PA (US); Andrew J. Male, Export, PA (US)

(73) Assignee: Ductmate Industries, Inc., Charleroi, PA (US)

( * ) Notice: Subject to any disclaimer, the term of this patent is extended or adjusted under 35 U.S.C. 154(b) by 581 days.

(21) Appl. No.: 13/177,200

(22) Filed: Jul. 6, 2011

(65) Prior Publication Data

US 2011/0258852 A1 Oct. 27, 2011

Related U.S. Application Data

(62) Division of application No. 12/133,482, filed on Jun. 5, 2008, now Pat. No. 7,992,904.

(60) Provisional application No. 60/942,412, filed on Jun. 6, 2007.

(51) Int. Cl.
*B21D 51/16* (2006.01)
*F16L 9/00* (2006.01)
*F16L 21/08* (2006.01)
*F24F 13/02* (2006.01)

(52) U.S. Cl.
CPC ............ *F16L 21/08* (2013.01); *Y10T 29/49428* (2015.01); *Y10T 29/4998* (2015.01); *Y10T 29/49982* (2015.01); *F24F 13/0209* (2013.01)

(58) Field of Classification Search
CPC ......... F16L 21/08; F16L 9/02; F24F 13/0209; F16J 15/328; F16J 15/403; Y10T 29/4998; Y10T 29/49982; Y10T 29/49428
USPC .................. 29/402.02, 890.144, 890.14, 510, 29/527.1, 527.2, 453, 458, 469.5; 285/424, 374, 305; 138/162–164, 166, 138/168
See application file for complete search history.

(56) References Cited

U.S. PATENT DOCUMENTS

| | | | | |
|---|---|---|---|---|
| 4,099,747 A | * | 7/1978 | Meserole | 285/148.15 |
| 4,874,191 A | * | 10/1989 | Green | 285/332.3 |
| 5,393,106 A | * | 2/1995 | Schroeder | 285/136.1 |
| 6,026,803 A | * | 2/2000 | Wawrla | 126/307 R |
| 6,325,389 B1 | | 12/2001 | Sharify | |

* cited by examiner

*Primary Examiner* — Sarang Afzali
(74) *Attorney, Agent, or Firm* — Beck & Thomas, P.C.

(57) ABSTRACT

This invention relates to sealing HVAC ductwork along its joints in order to reduce air leakage. The ductwork can be sealed by the combination of a gasket and mechanical locking mechanism.

13 Claims, 6 Drawing Sheets

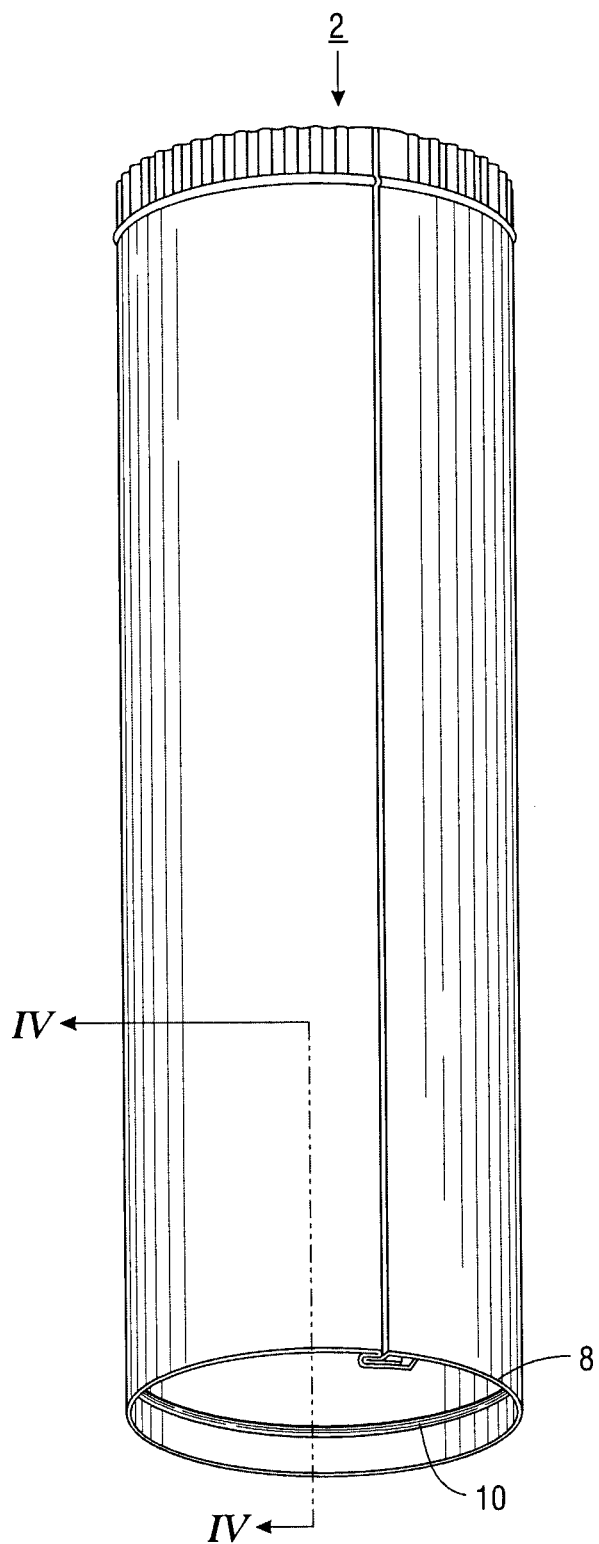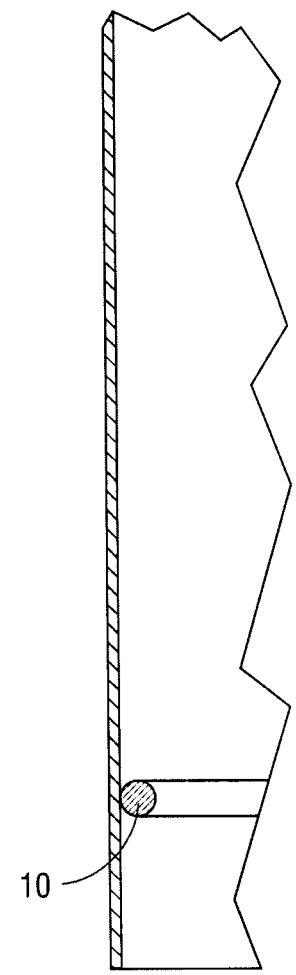
Fig.3
Fig.4

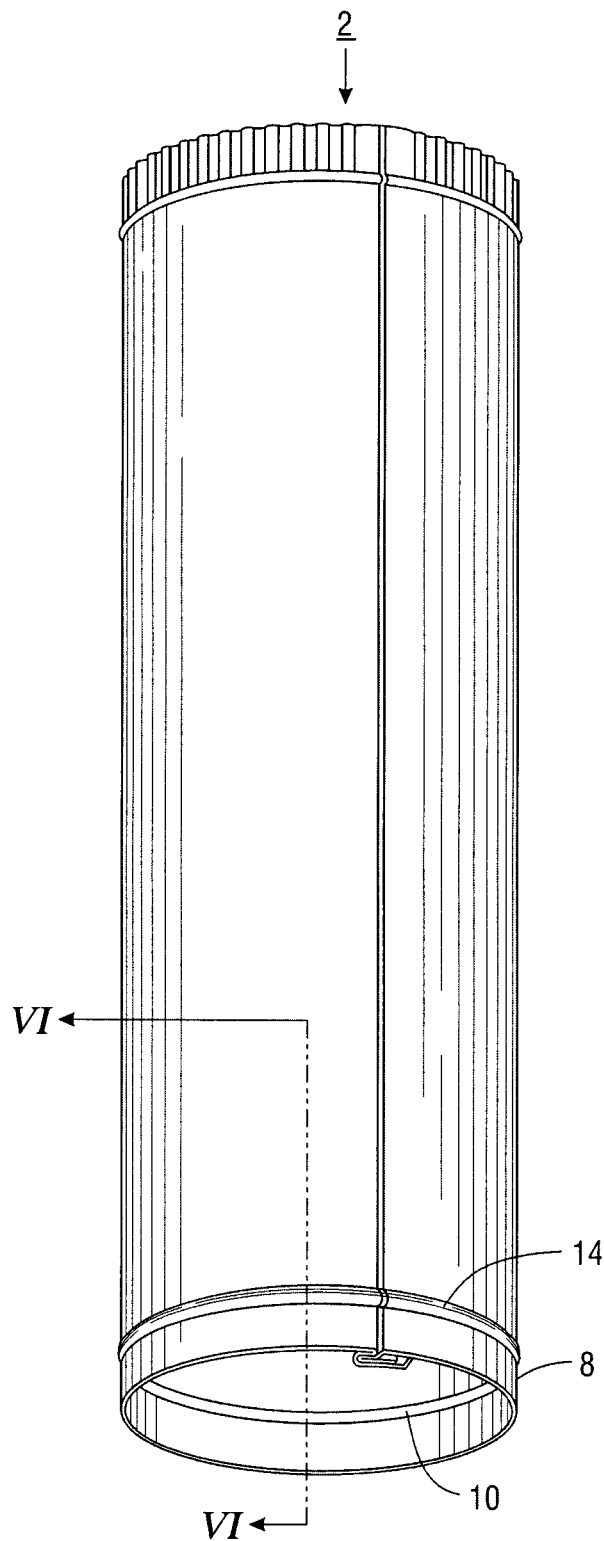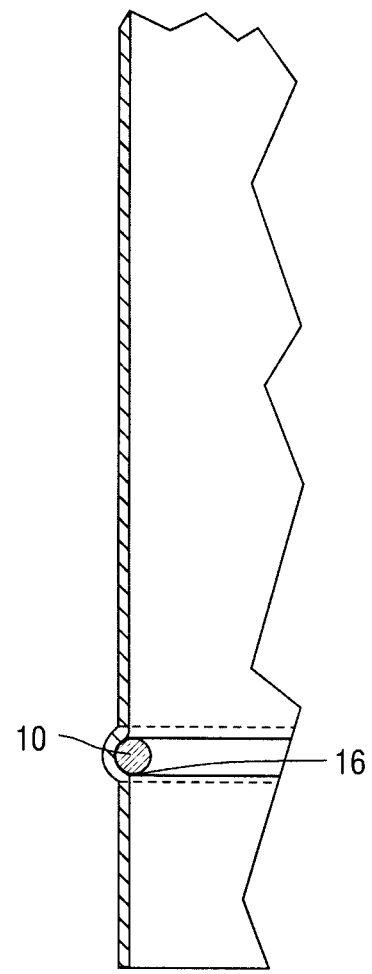
Fig.5
Fig.6

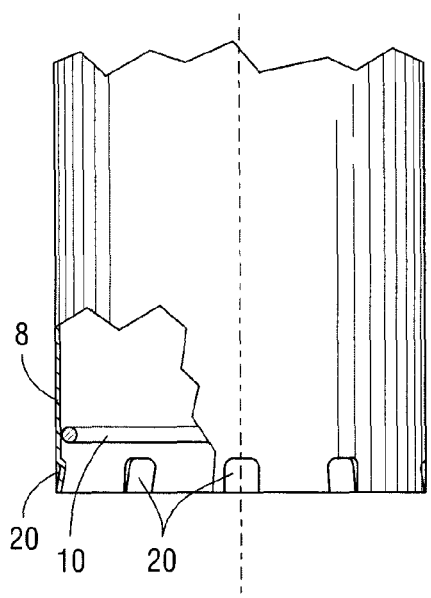
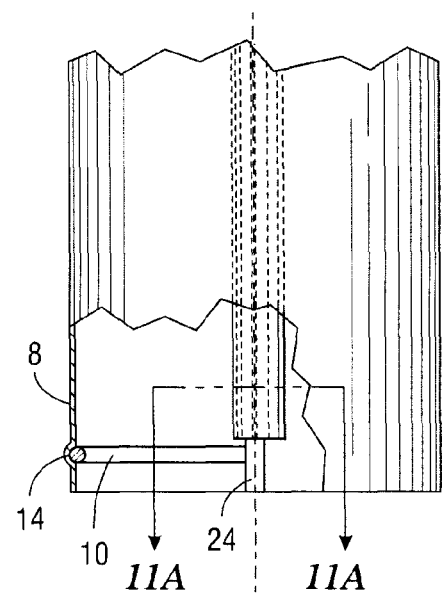
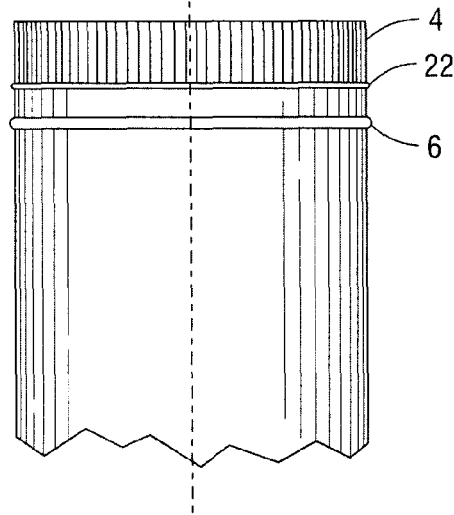
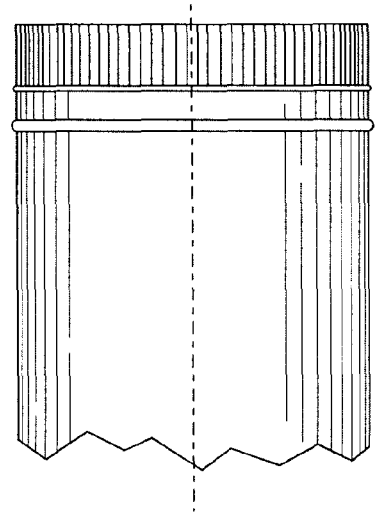
Fig.10  Fig.11
Fig.11A

PROCESS FOR MANUFACTURING SEALED ROUND METAL DUCTWORK

CROSS-REFERENCE TO RELATED APPLICATION

The present application is a divisional of application Ser. No. 12/133,482, filed Jun. 5, 2008, entitled "Sealing Mechanism for Ductwork," now U.S. Pat. No. 7,992,904, which claims the benefit of U.S. Provisional Application No. 60/942,412, filed Jun. 6, 2007. All of these applications are incorporated by reference herein.

BACKGROUND OF THE INVENTION

1. Field of the Invention

This invention generally relates to a connection for HVAC ductwork. This invention specifically relates to a sealing mechanism for HVAC ductwork that reduces air leakage in joints.

2. Description of the Related Art

Traditional ductwork has air leakage at the joints. There has been a need to add a gasket material to the joints so that when the ductwork is connected little leakage occurs. However to be able to add a gasketing material during the manufacturing process the gasketing material would have to have the following properties:

1) Good adhesion to sheet metal;
2) Minimal surface tack; and
3) Short curing time.

There are numerous materials that have two out of the three qualities listed above but it is very difficult to find one having all three. Therefore, adding a gasketing material to the manufacturing process has been impractical. Typically in ductwork manufacturing it would take three seconds to form the longitudinal seam and then roll the sheet metal duct for shipping. As an example of how traditional gasketing materials would make the manufacturing process difficult one could look at adding a sealant that does not set up quickly. The sealant would have good adhesion to galvanized steel and little surface tack but does not set up quickly. It could take two to three hours or two to three days for the gasketing material to set up or cure. This length of time is not practical as either one would have to wait for each individual sheet to cure or you would have to have some type of stacking systems where the sheets are not touching each other. This would make volume manufacturing in a timely fashion impossible. Additionally, if the material sets up quickly but has too much surface tack it will cause problems in the shipping when the ducts are nested together.

U.S. Pat. No. 6,325,389 entitled a Self Sealing Duct/Fitting Connector describes the problems in the prior art with Conventional HVAC systems. It describes the air leakage at the joints with traditional ductwork. The solution in U.S. Pat. No. 6,325,389 is a special connector for the ductwork with a sealant.

There is need for sealing the connections between ductwork without having a special fitting that is incorporated in the connections manufactured into the duct work.

SUMMARY OF THE INVENTION

This invention provides for a round metal heating ventilation and air conditioning duct for residential or commercial use having a gasket that adheres to the sheet metal and has minimal surface tack. The round metal duct is made from sheet metal and used for the transportation of heated air, air, or cooled air from one location to another. The duct has a male end which is crimped and has a bead on one end of the round duct. The male end is to be inserted into a corresponding female end of another round duct. The duct also has a female end on an opposite end of the round duct to receive a corresponding male end of another round duct.

The gasket may be provided in a first state and can then be cured. The curing process can include an agent and may be complete in 20 minutes or less. Additionally, the gasket may be foamed.

The entire process of making the duct could take 20 minutes or less.

The cured gasket adheres to the duct proximate to an end of the duct.

This invention also provides for the use of ultraviolet light to quicken the curing of the gasketing material. The gasketing material could also be foamed.

The gasketing material can be located:
1) on a leading edge of the male bead;
2) on the inside of the sheet proximate to the female end;
3) on an inside of the female bead; or
4) on an inside of a flared portion of the female end.

This invention also provided for a method of manufacturing round sheet metal ducts. Sheet metal is provided. A female end is formed on one end of the sheet metal. The female end is capable of receiving a male end of a different piece of ductwork. A male bead is formed on the male end of the duct. A longitudinal snap locking mechanism on corresponding longitudinal sides of the sheet metal is formed so that when the snap locking mechanism is connected a duct is created.

BRIEF DESCRIPTION OF THE DRAWINGS

FIG. 3 is an isometric view of a single section of round ductwork showing a female end of a section of round ductwork.

FIG. 4 is a section view of a female end of the ductwork along section IV-IV.

FIG. 5 is an isometric view of a single section of round ductwork showing a female end of the ductwork having a bead.

FIG. 6 is a section view of a female end of the ductwork having a bead along section VI-VI.

FIG. 10 is an exploded view in partial section of mating ducts of the present invention.

FIG. 11 is an exploded view in partial section of mating ducts of the present invention.

FIG. 11A is a cross-sectional view of the longitudinal seam taken along line 11A-11A of FIG. 11.

DETAILED DESCRIPTION OF A PREFERRED EMBODIMENT

Definitions

Figure 1:
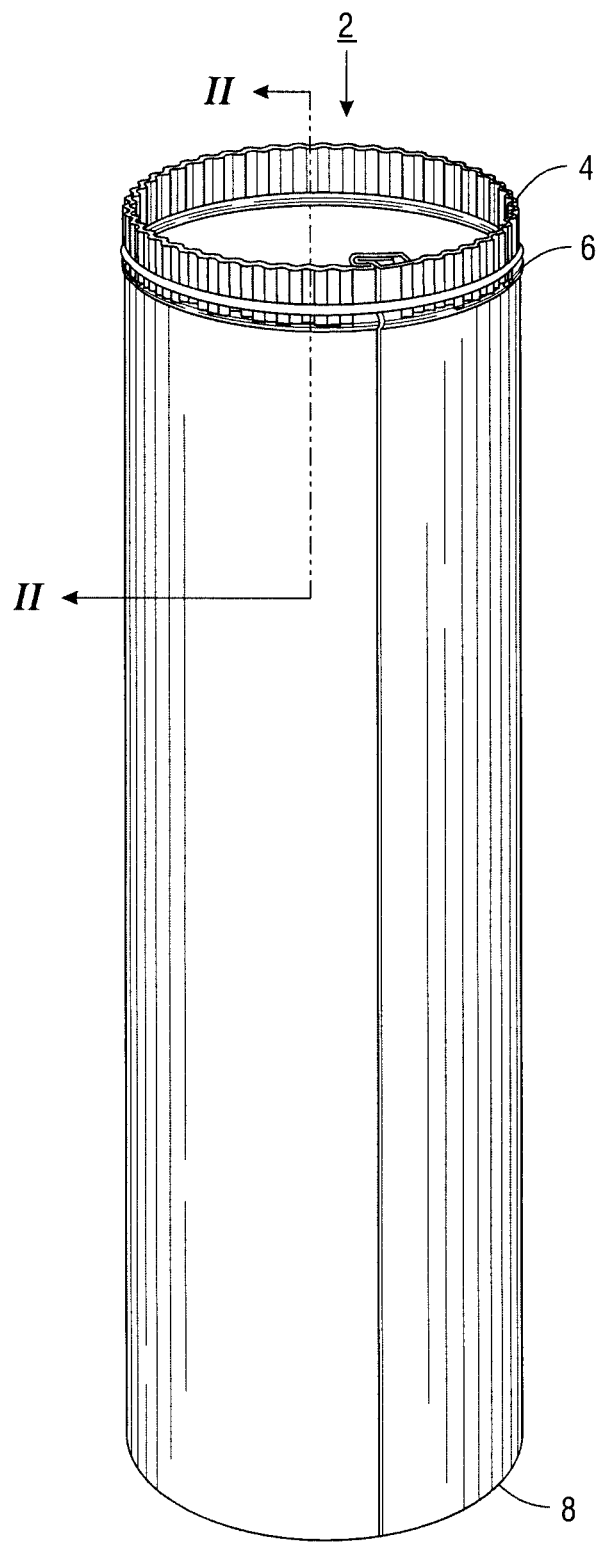
FIG. 1 is an isometric view of a single section of round ductwork showing a male end of a section of round ductwork.

"round metal heating ventilation and air conditioning duct for residential or commercial use"—A cylindrical tube used to transport air—this includes spiral, round and oval ducts.

"forming a male crimped end and a female"—creating two ends used to connect ductwork together in the sheet metal.

"forming a longitudinal latching system on the sheet metal duct"—creating a mechanism in the sheet metal to connect ends of the duct so that it creates a round metal duct.

"gasket"—any type of sealing material that reduces air leakage between the joints formed in the ductwork. This would include a preformed product that has a tape on it and can be applied to the duct. Loctite nuva sil 5039 is an example of cured gasket material.

"cured"—process by which gasket hardens or toughens or turns into a gasket. Can be cross linking of polymer chains.

"first state" means any pre-cured state. Could be a liquid or other state of polymer or other material prior to reaching its final hardened or cured state as a gasket.

"adheres to the sheet metal"—attaching to the sheet metal.

"minimal surface tack"—When ducts are shipped they are nested against other ducts. The surface tack would be such that the ducts would not stick together and/or would not damage the gasket. This could be accomplished by putting a tape material on one side of the gasket. A gasket with a tape would be a gasket with minimal surface tack. Also an uncovered gasket that does not stick to other ducts would be a gasket with minimal surface tack.

"Ultraviolet"—(UV) light is electromagnetic radiation with a wavelength shorter than that of visible light, but longer than soft X-rays. It is so named because the spectrum consists of electromagnetic waves with frequencies higher than those that humans identify as the color violet.

"foamed"—injecting some gas or blowing agent causing the gasket to grow creating bubbles in gasket causing the gasket to be more compressible. A gasketing material that has gas bubbles. A Nordson foam mixer could be used to foam the gasketing material. It is desirable to foam the gasket because less gasket material can be used. If it is foamed at 50% then 50% less gasket material is used.

"sealed joint" means a ductwork joint that has less leakage than a ductwork joint without a gasket.

"ductwork"—includes other straight pieces of duct and all types of fittings.

"round metal duct"—a cylindrical tube used to transport air.

"male end"—designed with a projecting part for fitting into a corresponding female part.

"female end"—designed to be hollow or have a groove into which a corresponding male part fits.

"a bead"—an impression formed into sheet metal.

"a longitudinal snap locking mechanism"—something that allows two ends of duct to be joined together without a separate fastener. Examples of this are button lock and a reeves lock.

"sheet metal duct"—Any type of duct work.

"applying an agent"—Using an agent as to aid in the curing. It could be ultraviolet light, radiation, moisture, catalyst or light or anything to help in the curing.

"a female transverse positioning lock"—portion of transverse positioning lock on the female end.

"a male transverse positioning lock"—portion of a transverse positioning lock on the male end.

"transverse positioning lock"—any type of mechanical structure that allows two pieces of ductwork to be rigidly joined together or locked together.

2—circular duct
4—crimped end
6—male bead
8—female end
10—gasket
12—leading edge
14—female bead
16—inside of female bead
18—flared portion

DESCRIPTION

FIG. 1 shows a circular duct 2. Male crimped end 4 has a male bead 6. The male crimped end 4 is designed to be inserted into female end 8 of another duct.

Figure 2:
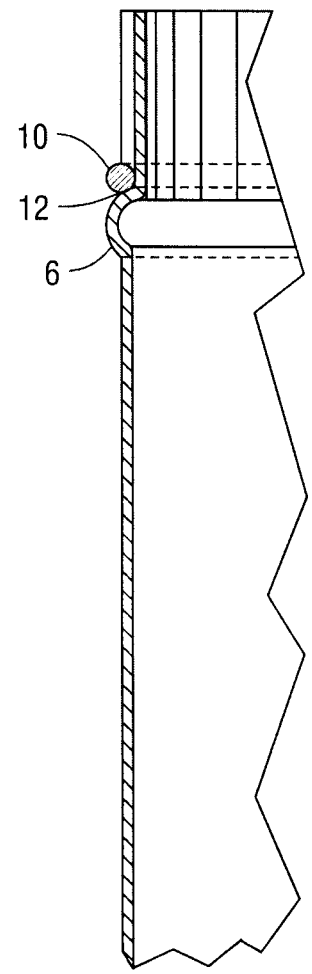
FIG. 2 is a section view of a male end of the ductwork along section II-II.

FIG. 2 shows section II-II of FIG. 1. Fast curing gasket 10 is on a leading edge 12 of the male bead 6. The fast curing gasket 10 is proximate to the male end 4.

FIG. 3 shows a second embodiment of a circular duct 2. The fast curing gasket 10 is proximate to the female end 8.

FIG. 3 shows section IV-IV of FIG. 3. Fast curing gasket 10 is proximate to female end 8.

FIG. 5 shows a third embodiment of a circular duct 2. The female end 8 has a female bead 14.

FIG. 6 shows section VI-VI of FIG. 5. Fast curing gasket 10 is located on an inside of the female bead 16.

Figure 7:
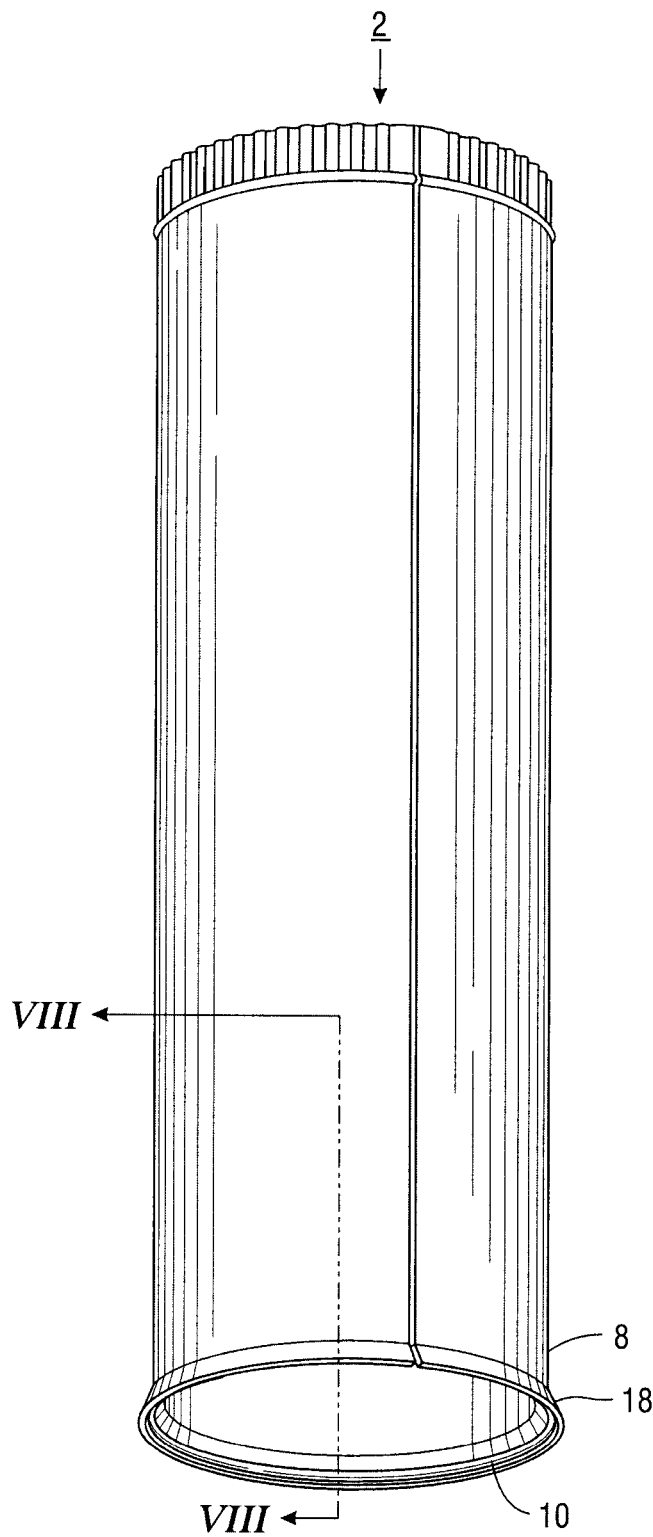
FIG. 7 is an isometric view of a single section of a ductwork having a flared female end.

FIG. 7 shows a fourth embodiment of a circular duct 2. Female end 8 has a flared portion 18.

Figure 8:
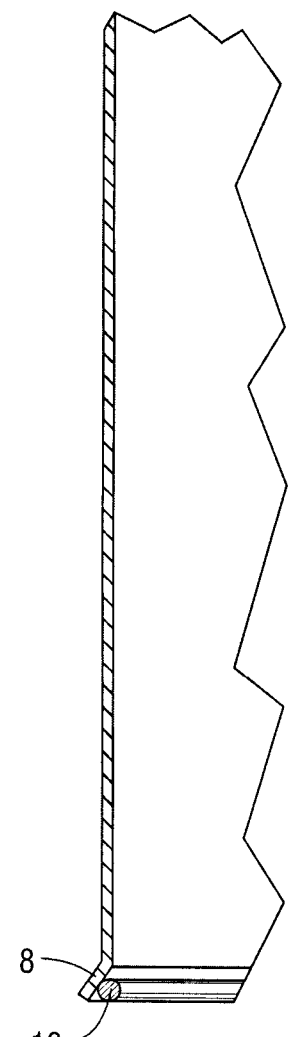
FIG. 8 is a section view of a female end of the ductwork having a flared female end along section VIII-VIII.

FIG. 8 is a cross section along VIII-VIII of FIG. 7. Fast curing gasket 10 is located in the flair portion 18. When a male crimped end 4 is inserted into the female end 8, the male crimped end 4 is able to enter without touching the gasket 10 and the gasket 10 seals on a non crimped part of the crimped male end 4.

Figure 9:
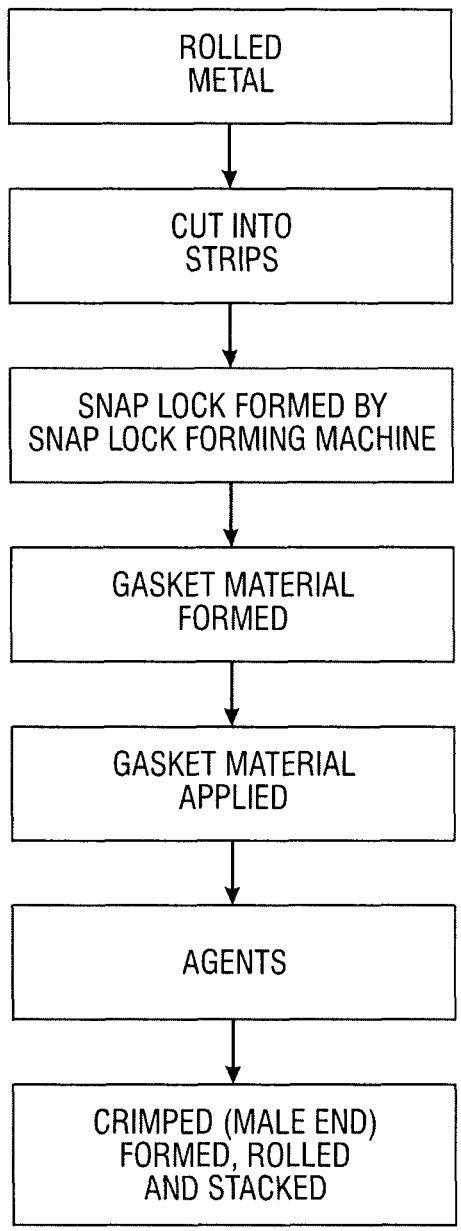
FIG. 9 is a block diagram of the method for forming ductwork.

FIG. 9 is a block diagram of the method of making the circular duct. Sheet metal is cut off of a master coil and travels down a conveyor. The sheet travels into a machine where it may or may not get clipped. The optional female bead can be put in the female portion or the flared portion could be created. Optionally at the same time the gasket may be put onto the sheet at that time. Paper or some sort of covering agent might be placed onto the gasket so that it doesn't stick to adjacent pieces of ducts during shipping thereby making it have little surface tack. By doing it this way it gives the fast curing gasket time to cure and if release paper is used it is a nice flat non stick surface at this point. The gasket may travel under ultraviolet lights to cure. Additionally other agents may be used to increase curing time or aid in curing of the gasket.

The sheet will then travel down the conveyor to the roll forming machines where the longitudinal snap locking mechanism is formed and optionally sealant is applied. This can be seen in application Ser. No. 11/739,238 which is hereby incorporated by reference in its entirety.

After the longitudinal snap locking mechanism is formed the male portion is formed by crimping an end of the sheet metal. At this same time the male bead is put on.

At this time applicants believe that the preferred embodiment would add the gasket after the longitudinal snap locking mechanism but prior to male portion being formed. The gasket material is Loctite Nuva Sil 5039 and preferably is foamed when used in this application. It is foamed by a Nordsen Ultra Foam Machine. The foaming helps with the compressibility of the gasket. The compressibility could be determined in a manner of hardness. The hardness could be measured by a durometer and have a hardness less than Shore A 75. Preferably it would have hardness of Shore 00 in the range of 30-50.

A section on the end of the sheet metal may be notched out so that the longitudinal snap locking mechanism stops short of the bead so that it is not crushed when the longitudinal snap locking mechanism is formed. The notched out part helps to form a better seal because the male portion can fit better into the female portion.

The male and female sections can be put together and a sealed connection is created without having to take any further steps. When discussing a sealed connection it is meant to refer where minimal air leakage is present or less leakage than when there is no sealant in the connection.

FIG. 10 shows a first embodiment of a transverse positioning lock. On the female end 8 of a duct there can be a button lock 20 which in this embodiment is the female transverse positioning lock. The gasket 10 is on an inside of the female end 8 of the duct. The crimped male end 4 has a second bead 22 which in this embodiment is the male transverse positioning lock. The crimped male end 4 fits into the female end so that the second bead 22 slides over buttons lock 20 and locks the pipes together and ensures that the gasket lines up correctly.

FIG. 11 shows a second embodiment of a transverse positioning lock. The female end 8 of the duct has a female bead 14. The female end has a cut out 24 on the longitudinal seam. The combination of the female bead 14 and the cut out 24 in this embodiment is the female transverse positioning lock. The longitudinal snap locking mechanism can be seen in FIG. 11. A female part 26 of the longitudinal snap locking mechanism is removed up until the female bead 14 to create the cut out 24. The crimped male end 4 has a second bead 22 which in this embodiment is the male transverse positioning lock. The crimped male end 4 fits into the female end so that the second bead 22 slides into female bead 14 and locks the pipes together and ensures that the gasket lines up correctly and creates a proper seal. The cut out 24 allows the duct to radially expand or contract.

Various changes could be made in the above construction and method without departing from the scope of the invention as defined in the claims below. It is intended that all matter contained in the paragraphs above, as shown in the accompanying drawings, shall be interpreted as illustrative and not as a limitation.

We claim:

1. In a process for manufacturing round sheet metal heating ventilation and air conditioning duct sections for residential or commercial use including providing a sheet metal, forming a longitudinal snap locking mechanism on the sheet metal, forming a male crimped end and a female end on the sheet metal so that round sheet metal duct sections are formed and a first round sheet metal duct section can connect to a second round sheet metal duct section by inserting the male crimped end of the first round sheet metal duct section into the female end of the second round sheet metal duct section or inserting the male crimped end of the second round sheet metal duct section into the female end of the first round sheet metal duct section, an improvement comprising applying, an uncured gasket to the round sheet metal duct sections while the round sheet metal duct sections are being manufactured and prior to stacking of the round sheet metal duct sections for shipping, the uncured gasket is applied in a location so that a seal between an inner and an outer cylindrical surfaces of the two round sheet metal duct sections is created when the first round sheet metal duct section is connected to the second round sheet metal duct section, wherein the uncured gasket cures prior to the first round sheet metal duct section being connected to the second round sheet metal duct section.

2. The process as recited in claim 1, wherein the uncured gasket is applied to the first sheet metal duct in a first state and is subsequently cured in place.

3. The process as recited in claim 2, wherein curing the uncured gasket includes applying a curing agent.

4. The process as recited in claim 2, wherein the uncured gasket is foamed.

5. The process as recited in claim 2, wherein the uncured gasket is cured in 20 minutes or less of being applied.

6. The process as recited in claim 1, wherein the uncured gasket is placed on the female end.

7. The process as recited in claim 1, wherein the male crimped end has a male bead and the uncured gasket is placed on a leading edge of the male bead.

8. The process as recited in claim 1, wherein the female end has a female bead and the uncured gasket is placed on an inside of the female bead.

9. The process as recited in claim 1, wherein the female end has a flared portion and the uncured gasket is placed inside of the flared portion.

10. The process as recited in claim 1, wherein the process takes 20 minutes or less to create a round sheet metal duct section.

11. The process as recited in claim 1, further including:
    (a) creating a female transverse positioning lock on the female end of the first sheet metal duct section; and
    (b) creating a male transverse positioning lock on the crimped male end of the first sheet metal duct section that corresponds to the female transverse positioning lock of a second duct section to position the connection of the two ducts properly so that the gasket functions to seal the transverse connection.

12. The process as recited in claim 1, further including creating a male transverse position lock on the male end of duct sections.

13. The process in claim 1, further including adding a sealant to the longitudinal snap locking mechanism.

* * * * *